(12) United States Patent
Li et al.

(10) Patent No.: US 7,529,067 B2
(45) Date of Patent: May 5, 2009

(54) EXCHANGE BIAS STRUCTURE FOR ABUTTED JUNCTION GMR SENSOR

(75) Inventors: Yun-Fei Li, Fremont, CA (US);
Hui-Chuan Wang, Pleasanton, CA (US); Chyu-Jiuh Torng, Pleasanton, CA (US); Cherng-Chyi Han, San Jose, CA (US); Mao-Min Chen, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 360 days.

(21) Appl. No.: 11/375,323

(22) Filed: Mar. 14, 2006

(65) Prior Publication Data

US 2006/0164766 A1 Jul. 27, 2006

Related U.S. Application Data

(62) Division of application No. 10/277,477, filed on Oct. 22, 2002, now Pat. No. 7,022,383.

(51) Int. Cl.
G11B 5/39 (2006.01)

(52) U.S. Cl. .................................. 360/324.12
(58) Field of Classification Search .................. None
See application file for complete search history.

(56) References Cited

U.S. PATENT DOCUMENTS

| 6,266,218 | B1 | 7/2001 | Carey et al. |
| 6,275,362 | B1 | 8/2001 | Pinarbasi |
| 6,310,751 | B1 | 10/2001 | Guo et al. |
| 6,324,037 | B1 | 11/2001 | Zhu et al. |
| 6,721,143 | B2 | 4/2004 | Zheng et al. |
| 6,842,969 | B2 | 1/2005 | Dovek et al. |
| 7,035,060 | B2 | 4/2006 | Li et al. |
| 2003/0039079 | A1* | 2/2003 | Zheng et al. ............ 360/324.1 |
| 2004/0105192 | A1* | 6/2004 | Chien et al. ............ 360/324.1 |
| 2004/0105193 | A1* | 6/2004 | Horng et al. .......... 360/324.11 |
| 2004/0223269 | A1* | 11/2004 | Wang et al. ........... 360/324.12 |

OTHER PUBLICATIONS

"Giant Magnetoresistance in Soft Ferromagnetic Multi-layers", by B. Dieng et al., 1991 The American Physical Society, Physical Review B, vol. 43, No. 1, Jan. 1, 1991, pp. 1297-1300.
Magnetism and Magnetic Materials 1974, AIP Conf. Proc., Series, Editor: Hugh C. Wolfe, No. 24, Am. Inst. of Physics, NY, 1975, "An Integrated Magnetoresistive Read, Inductive Write High Density Recording Head", pp. 548-549.

* cited by examiner

Primary Examiner—Mark Blouin
(74) Attorney, Agent, or Firm—Saile Ackerman LLC; Stephen B. Ackerman

(57) ABSTRACT

Although it is known that exchange bias can be utilized in abutted junctions for longitudinal stabilization, a relatively large moment is needed to pin down the sensor edges effectively. Due to the inverse dependence of the exchange bias on the magnetic layer thickness, a large exchange bias has been difficult to achieve by the prior art. This problem has been solved by introducing a structure in which the magnetic moment of the bias layer has been approximately doubled by pinning it from both above and below through exchange with antiferromagnetic layers. Additionally, since the antiferromagnetic layer is in direct abutted contact with the free layer, it acts directly to help stabilize the sensor edge, which is an advantage over the traditional magnetostatic pinning that had been used.

15 Claims, 3 Drawing Sheets

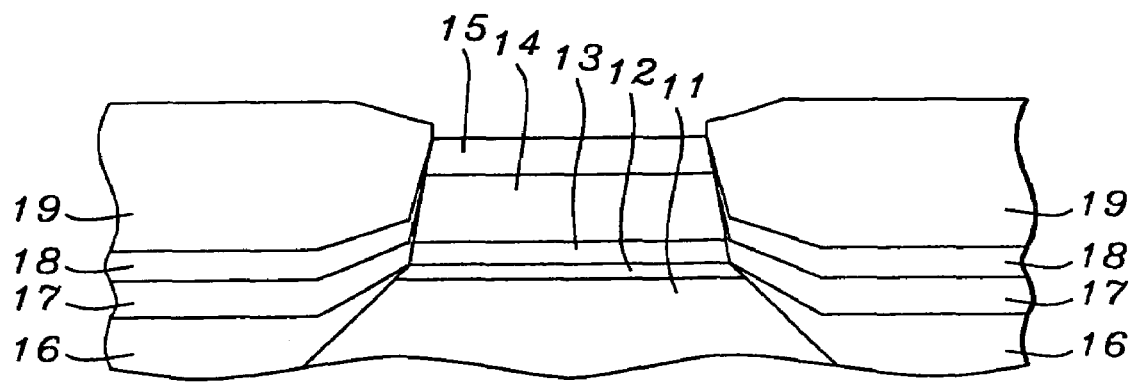
FIG. 1 – Prior Art
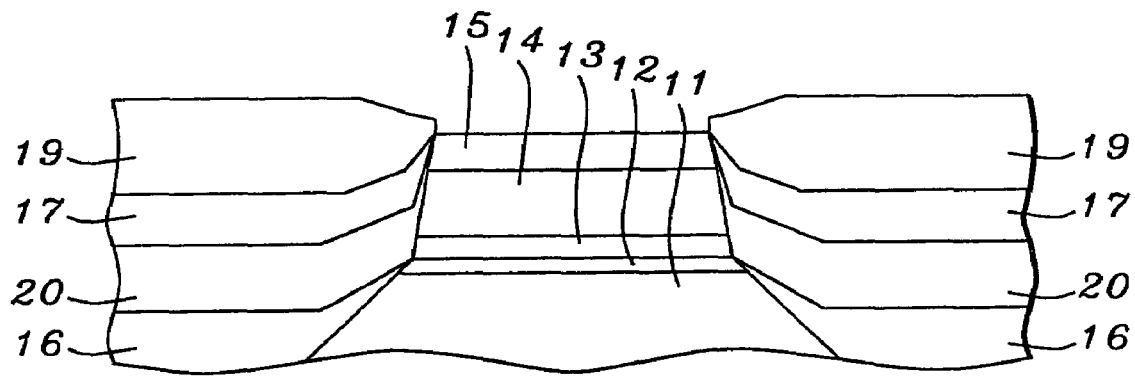
FIG. 2 – Prior Art
FIG. 3

EXCHANGE BIAS STRUCTURE FOR ABUTTED JUNCTION GMR SENSOR

This is a division of patent application Ser. No. 10/277,477 filing date Oct. 22, 2002, now U.S. Pat. No. 7,022,383 Exchange Bias Structure For Abutted Junction GMR Sensor, assigned to the same assignee as the present invention, which is herein incorporated by reference in its entirety.

FIELD OF THE INVENTION

The invention relates to the general field of magnetic read heads with particular reference to edge stabilization of spin valve structures.

BACKGROUND OF THE INVENTION

Due to the fast increase of recording density in the past decade, track widths continue to shrink into the deep sub-micron region. Currently, the magnetic track width has decreased to less than 0.2 μm for higher than 45 Gb/in$^2$ recording densities. Different sensor stabilization schemes have been proposed to suppress the ever increasing demagnetizing effect on the sensor edge, including traditional hard biased abutted junction (ABJ) schemes and continuous pattern exchange (PEX) bias stabilization schemes as shown in FIGS. 1 and 2.

FIG. 1 shows a central GMR (giant magneto-resistance) stack made up of a bottom antiferromagnetic (AFM) layer 11 which serves to pin the magnetization of pinned layer 12. Non-magnetic spacer layer 13 (typically copper) sits atop layer 12 and is itself covered by free layer 14. Capping layer 15 completes the stack.

Longitudinal bias stabilization is provided by a ferromagnetic layer 17 whose magnetization is pinned by an adjacent antiferromagnetic layer. Prior art practice has been to locate the latter either directly above layer 17 (layer 18 in FIG. 1) or directly below it (layer 20 in FIG. 2). Also seen in both figures are the conductive leads 19.

In the standard hard bias ABJ case, in order to maintain good sensor stabilization, a thick hard bias layer is required, which causes magnetic hardening of the free layer as track width drops, leading to a decrease of the sensor output amplitude. On the other hand, if the hard bias layer becomes too thin, its magnetic properties deteriorate, and sensor stability worsens. To counter this, pattern exchange bias schemes have been proposed. The difficulty with these lies in the fact that it requires an etch back process in the sensor region, which needs to be controlled accurately. This is very difficult to achieve in a production environment. Also the reduction of the MRW (magnetic read width) is somewhat limited. So far the most effective way to reduce the MRW remains the ABJ structure. But this traditional hard bias scheme reduces the sensor sensitivity and MRW too much, and its extendability to future generations is limited.

It is known that exchange bias can be utilized in abutted junction as well. The problem with this is that a relatively large moment is needed to pin down the sensor edges effectively. Due to the inverse dependence of the exchange bias on the magnetic layer thickness a large exchange bias has been difficult to achieve by the prior art.

A routine search of the prior art was performed with the following references of interest being found:

U.S. Pat. No. 6,324,037 B1 (Zhu et al.) shows a SV with an abutted junction and patterned exchange. U.S. Pat. No. 6,266,218 (Carey et al.) shows a MR with a Bottom SV and patterned exchange process. U.S. Pat. No. 6,275,362 B1 (Pinarbasi) describes a MR with a Bottom SV and buffer layer. U.S. Pat. No. 6,310,751 B1 (Guo et al.) shows a pattern exchange for a DSMR.

SUMMARY OF THE INVENTION

It has been an object of at least one embodiment of the present invention to provide a magnetic read head having a magnetic read width less than about 0.2 microns as well as good longitudinal stability.

Another object of at least one embodiment of the present invention has been that said read head be of the abutted junction type.

Still another object of at least one embodiment of the present invention has been to provide a process for manufacturing said read head.

These objects have been achieved in a structure that continues to be based on the traditional abutted junction. The principal improvement has been to approximately double the exchange bias of the bias layer by pinning it from both above and below through exchange with antiferromagnetic layers. Additionally, since the antiferromagnetic layer is in direct abutted contact with the free layer, it acts directly to help stabilize the sensor edge, which is an advantage over the traditional magnetostatic pinning that has been used.

BRIEF DESCRIPTION OF THE DRAWINGS

FIGS. 1 and 2 show two prior art configurations based on abutted junctions.

FIG. 3 shows the initial series of layers deposited for forming the structure of the present invention.

DESCRIPTION OF THE PREFERRED EMBODIMENTS

Figure 4:
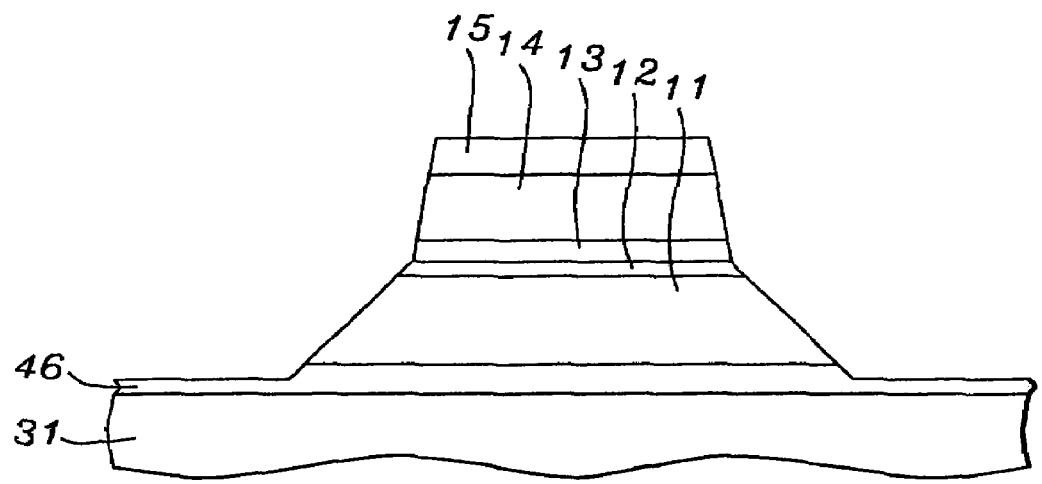
FIG. 4 illustrates formation of the GMR pillar according to a first embodiment of the invention.

The present invention is based on use of a novel sandwich structure having different seed layers to increase the exchange bias while still retaining the same magnetic layer thickness. For 40A CoFe, the observed exchange bias is almost doubled in our proposed structure from around 4000 e to 7500 e.

Our structure is composed of Seed/A1//A2 structure, the layer experiences the exchange bias from both top and bottom interface with the A layers, leading to the large increase of the exchange bias. The preferred structure could include IrMn and CoFe. The reason is that IrMn can be rather thin (less than 100 Å) and, furthermore, it does not require extensive annealing to achieve its high exchange bias. CoFe is preferred because it couples well with IrMn and its moment is higher than NiFe, which means that its physical thickness can be reduced. The seed layer in this structure can be either deposited later along with the exchange bias structure, or it may simply be left in place after the preceding IBE (ion beam etching) step that was used to create the junction pedestal. For example, for the standard BSV (bottom spin valve) process, the seed layer left over could be nickel-chromium with some MP (manganese platinum).

Referring now to FIG. 3, we begin a description of a process for manufacturing the present invention. This description will also further clarify the structure of the present invention. The process begins with the provision of substrate 31 onto which is deposited seed layer 16. Suitable materials for the seed layer include Ta, NiFe, NiFeCr, and NiCr and it is deposited to a thickness between about 30 and 100 Angstroms. Next comes the deposition of antiferromagnetic layer 11 (materials such as MnPt, NiMn, IrMn, PtPdMn, AuMn, RhMn, RuRhMn, OsMn, and CrPtMn) and it is deposited to a thickness between about 30 and 300 Angstroms.

This is followed by the deposition of pinned layer structure 12 which is formed by first depositing an AP1 ferromagnetic layer to a thickness between about between about 5 and 25 Angstroms. AP1 is then magnetized in a first direction following which an antiferromagnetic coupling layer (e.g. Ru or Rh) is deposited to a thickness between about between about 2 and 10 Angstroms. A second ferromagnetic layer, AP2, is then deposited to a thickness between about between about 5 and 35 Angstroms on the antiferromagnetic coupling layer and AP2 is magnetized in a second direction that is antiparallel to said first direction.

Non-magnetic spacer layer 13 is then deposited on pinned layer structure 12, this being followed by the deposition of free layer 14, made of a material such as Cu, Fe, CoFe, CoFeB, NiFe, and CuFe, and deposited to a thickness between about 15 and 70 Angstroms. This part of the process concludes with the deposition of capping layer 15.

Referring next to FIG. 4, a photoresist mask (not shown) is formed at a central location on layer 15 to define the read head pillar itself. Then ion milling is used to remove material not protected by the mask. Because of undercutting of the mask as ion milling proceeds, the pillar is formed with sloping sides, as shown in FIG. 4. No end point detection is needed to decide precisely when the seed layer has been reached since it is not important to control how much, if any, of the seed layer remains at the conclusion of ion milling. In FIG. 4 we show the seed layer (now labeled as 46) having been partly removed outside the pillar.

Figure 5:
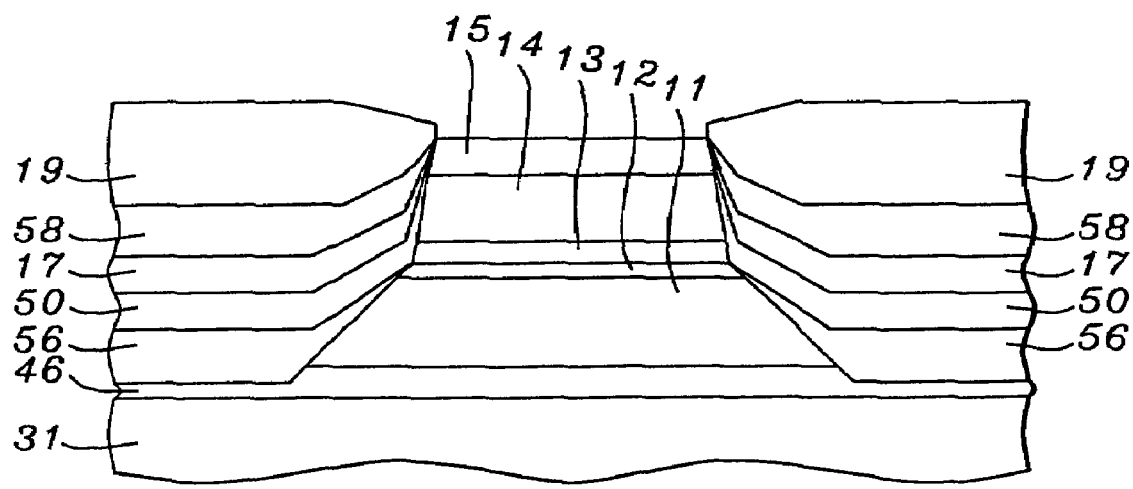
FIG. 5 shows the completed device according to said first embodiment.

The longitudinal biasing structure is now formed, as illustrated in FIG. 5. With the photoresist mask still in place, second seed layer 56 is deposited over first seed layer 46 to a thickness sufficient for it to extend up the sides of the pillar approximately as far as free layer 14 (between about 10 and 100 Angstroms). Second seed layer 56 is a material such as Ta, NiFe, Cu, NiFeCr, and NiCr. Then, antiferromagnetic layer 50 (IrMn, RuMn, RhMn, RuRhMn, OsMn, NiMn, PtMn) is deposited to a thickness between about 20 and 200 Angstroms, followed by the successive depositions of ferromagnetic layer 17 (CoFe, CoFeB, NiFe, Co, and Fe), deposited to a thickness between about 50 and 300 Angstroms), and antiferromagnetic layer 58 (IrMn, RuMn, RhMn, RuRhMn, OsMn, NiMn, and PtMn) deposited to a thickness between about 20 and 200 Angstroms). The last layer to be deposited is conductive lead layer 19.

Using standard liftoff procedures, the photoresist mask is now removed, along with all material that had deposited onto it, thereby exposing capping layer 15 and giving the structure the appearance illustrated in FIG. 5. The device is completed with an annealing step which causes ferromagnetic layer 17 to become permanently magnetized through exchange bias provided by the two antiferromagnetic layers 50 and 58 which enables it to provide longitudinal stabilization for the free layer (of between about 100 and 1,000 Oe). by virtue of its making abutted contact to it.

Figure 6:
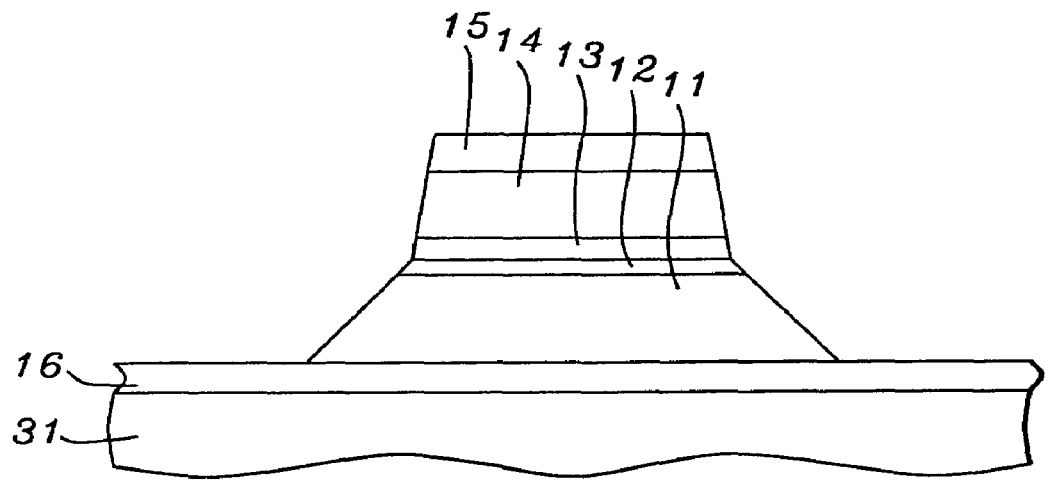
FIG. 6 illustrates formation of the GMR pillar according to a second embodiment of the invention.
Figure 7:
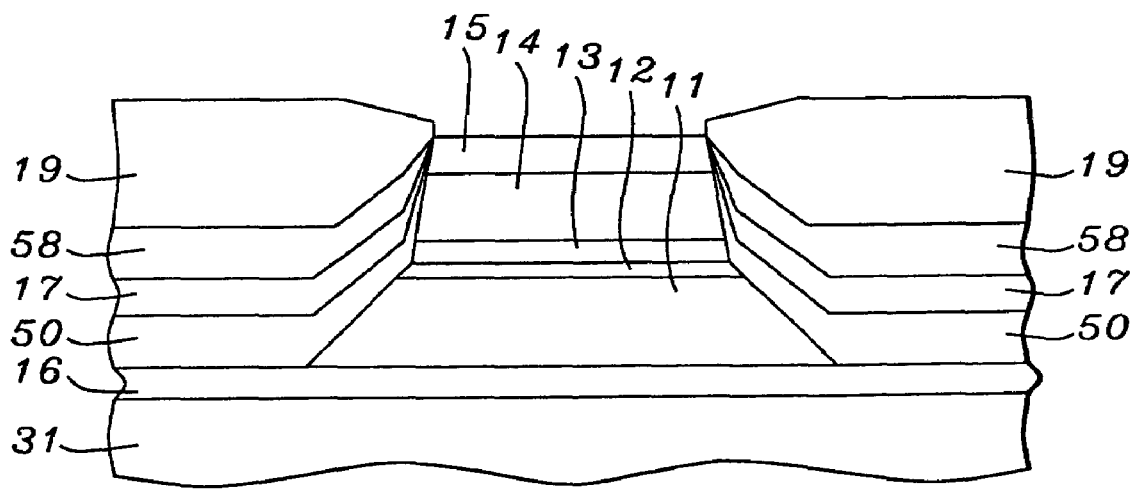
FIG. 7 shows the completed device according to said second embodiment.

A second embodiment of the invention also begins with the formation of the layered structure shown in FIG. 3. However, during the formation of the read head pillar by ion milling, end point detection is used to ensure that ion bombardment ceases as soon as seed layer 16 has been exposed. This allows deposition of a second seed layer (56 in FIG. 5) to be omitted, giving the structure the appearance illustrated in FIG. 6. The process is then completed as in the previous embodiment, the completed unit being as shown in FIG. 7. Here again, ferromagnetic layer 17 has been permanently magnetized through exchange coupling with two antiferromagnetic layers that contact its upper and lower surfaces, while being itself in abutted contact with the free layer.

SUMMARY

Compared to other schemes, the above described structure has the following advantages:

1. As a key feature, the exchange bias is significantly improved to about twice the value found in prior art structures, making the longitudinal stabilization more effective.

2. The traditional abutted junction structure continues to be utilized. This helps to reduce the MRW more effectively and no modification of the current manufacturing process is needed.

3. The ion beam milling step may be terminated without the need for an etch stop since the seed layer is to be left behind, there being no need to deposit another seed layer. The AFM layer is in direct contact with the edge of the free layer, so it acts directly to help stabilize the sensor edge, which is an advantage in addition to the traditional magnetostatic pinning provided by the FM layer.

4. As track widths continue to shrink and free layer moments continues to drop, the required pinning moment will also be reduced. This will intrinsically make the exchange bias even stronger, offering good extendability relative to other read head structures.

What is claimed is:

1. A GMR read head structure, comprising:

a first part of a seed layer on a substrate;

centrally located on said first seed layer part, a pillar having sloping opposing sides, said pillar further comprising:

a first antiferromagnetic layer on said first seed layer part;

a pinned layer structure on said first antiferromagnetic layer;

a non-magnetic spacer layer on said pinned layer structure;

a free layer on said spacer layer and a capping layer on said free layer;

on the sloping opposing sides of said pillar, a second part of said seed layer that extends from above said first part, over said sloping sides, as far as said free layer;

a second antiferromagnetic layer on said second seed layer part;

a ferromagnetic layer on said second antiferromagnetic layer;

a third antiferromagnetic layer on said ferromagnetic layer;

a conductive lead layer on said third ferromagnetic layer; and said ferromagnetic layer being permanently magnetized through exchange bias provided by both said second and third antiferromagnetic layers whereby it provides longitudinal stabilization for said free layer of between about 100 and 1,000 Oe.

2. The read head described in claim 1 wherein said first seed layer part is selected from the group consisting of Ta, NiFe, NiFeCr, NiCr.

3. The read head described in claim 1 wherein said first seed layer part has a thickness between about 30 and 100 Angstroms.

4. The read head described in claim 1 wherein said first antiferromagnetic layer is selected from the group consisting of MnPt, NiMn, IrMn, PtPdMn, RuMn, RhMn, RuRhMn, and OsMn.

5. The read head described in claim 1 wherein said first antiferromagnetic layer has a thickness between about 30 and 500 Angstroms.

6. The read head described in claim 1 wherein said pinned layer structure, on said first antiferromagnetic layer, further comprises:
- an AP1 ferromagnetic layer having a thickness between about between about 5 and 25 Angstroms, magnetized in a first direction;
- an antiferromagnetic coupling layer, having a thickness between about between about 2 and 10 Angstroms, on said AP1 ferromagnetic layer; and
- an AP2 ferromagnetic layer having a thickness between about between about 5 and 35 Angstroms, on said antiferromagnetic coupling layer, said AP2 ferromagnetic layer being magnetized in a second direction that is antiparallel to said first direction.

7. The read head described in claim 1 wherein said free layer is selected from the group consisting of CoFe, CoFeB, NiFe, Co, and Fe.

8. The read head described in claim 1 wherein said free layer has a thickness between about 15 and 70 Angstroms.

9. The read head described in claim 1 wherein said second antiferromagnetic layer is selected from the group consisting of MnPt, NiMn, IrMn, PtPdMn, RuMn, RhMn, RuRhMn, and OsMn.

10. The read head described in claim 1 wherein said second antiferromagnetic layer has a thickness between about 20 and 200 Angstroms.

11. The read head described in claim 1 wherein said ferromagnetic layer is selected from the group consisting of CoFe, CoFeB, NiFe, Co, and Fe.

12. The read head described in claim 1 wherein said ferromagnetic layer has a thickness between about 50 and 300 Angstroms.

13. The read head described in claim 1 wherein said third antiferromagnetic layer is selected from the group consisting of MnPt, NiMn, IrMn, PtPdMn, RuMn, RhMn, RuRhMn, and OsMn.

14. The read head described in claim 1 wherein said third antiferromagnetic layer has a thickness between about 20 and 200 Angstroms.

15. The read head described in claim 1 wherein said second seed layer part has a thickness, over said first part, of between about 10 and 100 Angstroms.

* * * * *